United States Patent [19]

Kaefer et al.

[11] Patent Number: 5,326,508
[45] Date of Patent: Jul. 5, 1994

[54] METHOD FOR MANUFACTURING SEMIFINISHED PRODUCTS FROM A MIXTURE OF RUBBER AND RUBBER-LIKE PLASTIC MATERIALS BY SHOCK COOLING TO INCREASE TACKINESS

[75] Inventors: Michaela Kaefer, Wedemark; Holger Hoffmann, Helpsen, both of Fed. Rep. of Germany

[73] Assignee: Continental Aktiengesellschaft, Hanover, Fed. Rep. of Germany

[21] Appl. No.: 37,369

[22] Filed: Mar. 26, 1993

[30] Foreign Application Priority Data

Apr. 7, 1992 [DE] Fed. Rep. of Germany ....... 4211669

[51] Int. Cl.⁵ .................... B29C 47/88; B29C 43/52
[52] U.S. Cl. .................... 264/28; 264/178 R; 264/175; 264/176.1; 264/177.19; 264/237; 425/71; 425/379.1
[58] Field of Search ............. 264/28, 175, 40.6, 176.1, 264/237, 236, 177.17, 177.19, 348, 178 R; 425/378.1, 379.1, 71

[56] References Cited

U.S. PATENT DOCUMENTS

| | | | |
|---|---|---|---|
| 4,178,337 | 12/1979 | Hall et al. | 264/28 |
| 4,190,473 | 2/1980 | Soecknick et al. | 264/28 |
| 4,212,171 | 7/1980 | Soecknick | 264/28 |
| 4,226,818 | 10/1980 | Brower et al. | 264/348 |
| 4,389,366 | 6/1983 | Hoesslin et al. | 425/378.1 |
| 4,421,709 | 12/1983 | Steinberg | 264/216 |
| 4,696,779 | 9/1987 | Wideman | 425/378.1 |
| 4,719,071 | 1/1988 | Capelle | 264/177.19 |
| 4,911,874 | 3/1990 | Peiffer et al. | 425/378.1 |
| 4,931,232 | 6/1990 | Lermuzeaux et al. | 264/28 |

FOREIGN PATENT DOCUMENTS

| | | |
|---|---|---|
| 0172924 | 3/1986 | European Pat. Off. . |
| 2527942 | 6/1975 | Fed. Rep. of Germany . |
| 3928482 | 8/1989 | Fed. Rep. of Germany . |
| 3936795 | 11/1989 | Fed. Rep. of Germany . |
| 4038447 | 12/1990 | Fed. Rep. of Germany . |

*Primary Examiner*—Jeffery R. Thurlow
*Attorney, Agent, or Firm*—Robert W. Becker & Associates

[57] ABSTRACT

A method for manufacturing calendered and/or extruded semifinished products with increased surface tackiness from a mixture of rubber and rubber-like plastic materials employs a shock-cooling step for cooling the hot semifinished products at a maximum shock cooling temperature of 0° C.

13 Claims, 1 Drawing Sheet

METHOD FOR MANUFACTURING SEMIFINISHED PRODUCTS FROM A MIXTURE OF RUBBER AND RUBBER-LIKE PLASTIC MATERIALS BY SHOCK COOLING TO INCREASE TACKINESS

BACKGROUND OF THE INVENTION

The present invention relates to a method for manufacturing calendered and/or extruded semifinished products with increased surface tackiness made from a mixture of rubber and rubber-like plastic materials as well as a device for performing the method.

With semifinished products of rubber mixtures, for example, with components for the construction of tires, it is often important that the surface of these articles be provided with high tackiness so that during assembly a good adhesion to neighboring layers can be achieved. A plurality of methods for increasing the surface tackiness of semifinished products of rubber mixtures are known. For example, in an additional working step solutions are applied by pasting to the surface and generate the required surface tackiness.

It is an object of the present invention to provide a more favorable manufacturing process for semifinished products of the aforementioned kind which furthermore can be directly integrated into the conventional manufacturing process of the semifinished products.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
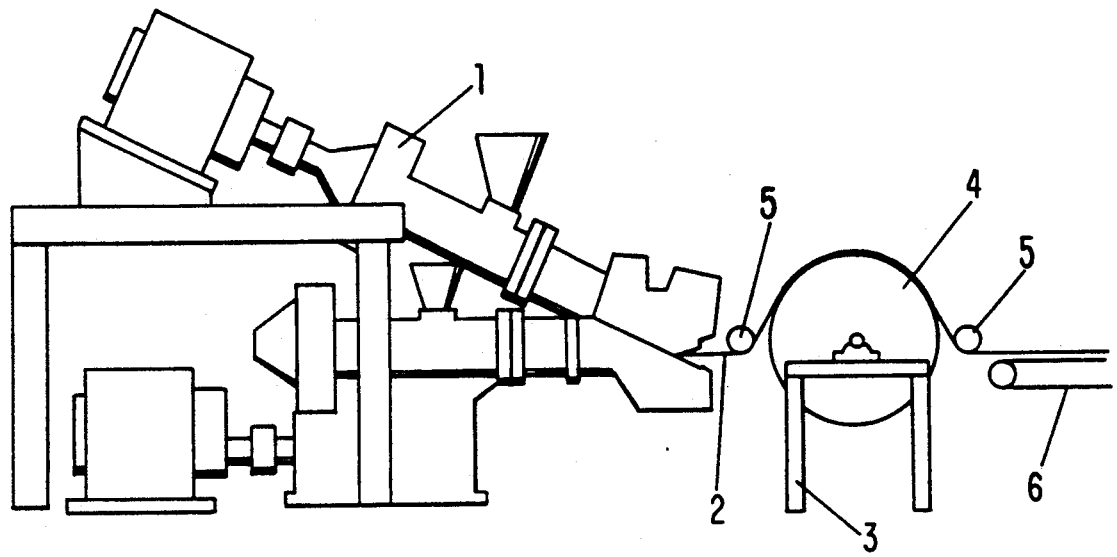
FIG. 1 shows a device for cooling tire tread strips for pneumatic vehicle tires.

According to the inventive method for manufacturing calendered and/or extruded semifinished products with increased surface tackiness made from a mixture of rubber and rubber-like plastic materials, the hot semifinished products are shock cooled at a maximum temperature of 0° C. The invention is based on the finding that the surface tackiness of a semifinished product is substantially increased when the hot article is subjected to a shock cooling step, i.e., a cooling with a great cooling speed. This can be achieved by providing a cooling temperature of 0° C. or less, preferably below −100° C.

Due to the strong increase of the tackiness at the surface of the semifinished products the invention has the advantage that during assembly of the rubber end product a substantially increased adhesion to other rubber parts is achieved. By avoiding solutions that have to be applied the release of respective gases is prevented so that the inventive method is environmentally safe.

Even though the cooling effect according to the present invention primarily occurs at the surface of the semifinished products it is however so effective that for somewhat thin profiles a conventional cooling, for example, in a water bath at room temperature can be completely dispensed with. The invention is also suitable for such components in which conventionally additional rubber strips, for example, so-called underplates during manufacture of tire tread strips for pneumatic vehicle tires, must be used for increasing the tackiness.

In a preferred embodiment of the present invention the shock cooling step is carried out with liquified gas, for example, with liquid nitrogen. In theory it is possible to guide the semifinished product of a rubber mixture through an open bath of liquid nitrogen; however, this would result in great losses of nitrogen gas. Therefore, the invention is preferably performed with closed cooling drums in which the liquid nitrogen is contained. The semifinished product is guided about at least one cooling drum at a peripheral angle extending over a great portion of the outer surface of the cooling drum so that a great cooling effect in a short period of time can be achieved. It is preferred that a temperature decrease by 70° to 90° C. occurs in less than 30 seconds, preferably in 10 to 20 seconds.

For increasing the cooling effect in a short period of time and thus improving the shock cooling effect, it is also possible to use a plurality of cooling drums horizontally arranged one after another and/or vertically stacked one above the other. With two vertically stacked cooling drums it is possible to guide the semifinished product in an S-configuration or a mirror-symmetrical S-configuration about two cooling drums so that the underside as well as the upper side of the semifinished product are subjected to a cooling effect. In a preferred embodiment the cooling drums are provided with inlet lines for the liquid gas as well as with outlet lines for the spent gas so that the spent gas can be recycled.

It is also possible to subject the semifinished product to an additional cooling step in a liquid bath.

DESCRIPTION OF PREFERRED EMBODIMENTS

The present invention will now be described in detail with the aid of several specific embodiments utilizing FIGS. 1 and 2.

FIG. 1 shows a conventional duplex extruder 1 for generating a strip 2 for tread strips of pneumatic vehicle tires. The strip 2 is comprised of two different rubber mixtures which are introduced into the hoppers of the duplex extruder 1. The strip 2 is guided to a cooling drum 4 supported on a frame 3 and is partially guided about it. The height adjustable guide rollers 5 serve to compensate for different velocities. The shock-cooled strip 2 can then be transported by the conveyor belt 6 to a further conventional treatment step. This further treatment can be in the form of a conventional liquid cooling bath into which the strip 2 is submerged which may be comprised of, for example, an aqueous salt solution at room temperature. The cutting of the strip 2 into tire tread strips for pneumatic vehicle tires of a desired length is then carried out according to conventional methods.

The cooling drum 4 in the shown example has a diameter of 1550 mm and a width of 500 mm. The circumferential length of the strip on the cooling drum is approximately 2 m. The cooling drum 4 is driven by a frequency-regulated motor. The cooling drum 4 is filled with liquid nitrogen to about ⅓ or ¼ of its volume. The liquid nitrogen is introduced via an inlet line in the axle of the cooling drum 4. The cooling drum 4 is also provided with a non-represented outlet opening for removing the spent nitrogen gas which is recycled and, for example, returned into an inert gas heating system of the vulcanization process. The strip 2 exits the extruder 1 at a velocity of approximately 9.5 mm per minute so that for a circumferential length of 2 m on the cooling drum 4 a contacting time of approximately 20 seconds results. While the liquid nitrogen cools the cooling drum at least in the beginning to approximately −195° C., at the underside of the strip 2 directly behind the cooling drum 4 temperatures of 25° C. have been measured. Since the strip 2 leaves the extruder 1 at a temperature of approximately 105° C. this results within the limits of the shock cooling step in a temperature reduction of 80° C. in 20 seconds. It should be noted that it is advantageous to use cooling drums of a greater diameter, for example, of a diameter of 2.5 to 3 mm. Furthermore, it is possible to use a plurality of cooling drums that are sequentially arranged in order to improve the shock cooling effect.

Figure 2:
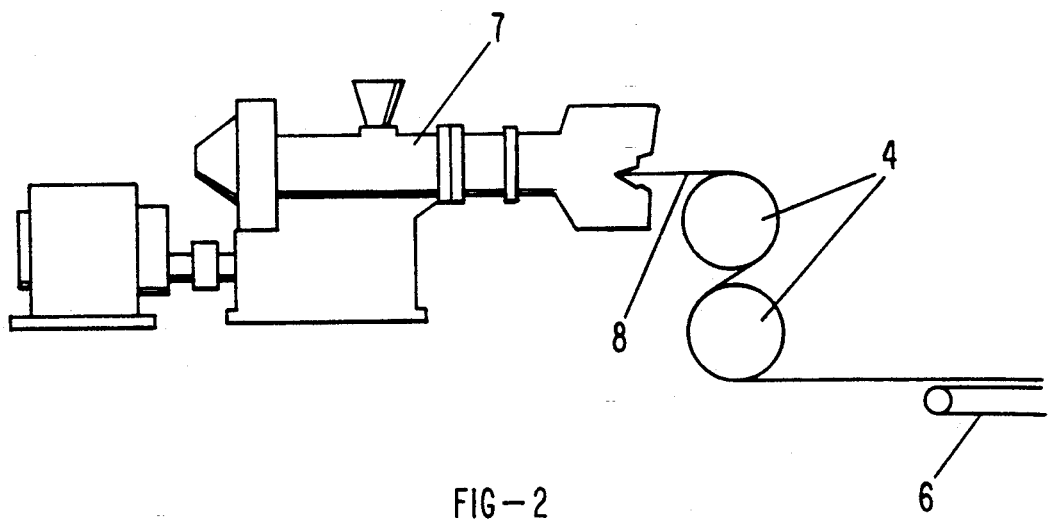
FIG. 2 is a device with two cooling drums arranged vertically above one another for cooling an endless profile.

FIG. 2 shows schematically a device in which with the extruder 7 a thin endless or continuous profile 8 is produced from a rubber mixture. The endless or continuous profile 8 is guided in a mirror-symmetrical S-configuration about two cooling drums 4 arranged atop one another and is then further transported by the conveyor belt 6 to further treatment steps or a winding station. By using two cooling drums 4 and the aforedescribed S-configuration for guiding the strip through the cooling drums the endless profile 8 is shock-cooled at its underside as well as at its upper side so that both sides are provided with a surface of an increased tackiness. With this cooling method a further cooling step in a conventional liquid bath is in general obsolete.

The present invention is, of course, in no way restricted to the specific disclosure of the specification and drawings, but also encompasses any modifications within the scope of the appended claims.

What we claim:

1. A method for manufacturing calendered and/or extruded semifinished products with increased surface tackiness from a mixture of rubber and rubber-like plastic materials, said method comprising the steps of:

producing semifinished products by extrusion and/or calendering; and shock cooling the hot semifinished products at a maximum shock cooling temperature of 0° C. for increasing tackiness.

2. A method according to claim 1, further comprising the step of applying a liquefied gas for said shock cooling step.

3. A method according to claim 2, further comprising the step of recycling the spent liquefied gas.

4. A method according to claim 1, further comprising the step of applying liquid nitrogen for said shock cooling step.

5. A method according to claim 1, further comprising the step of decreasing the temperature of the semifinished product by 70° to 90° C. in less than 30 sec.

6. A method according to claim 1, wherein the semifinished products are tire tread strips.

7. A method according to claim 1, wherein the semifinished products are profiled strips.

8. A method according to claim 1, further comprising the step of subjecting the semifinished products to a further cooling step in a liquid bath.

9. A method according to claim 1, further comprising the step of guiding the semifinished products over at least one cooling drum filled with a liquefied gas as a coolant.

10. A method according to claim 9, further comprising the step of substantially horizontally arranging two or more of the cooling drums adjacent to one another.

11. A method according to claim 9, further comprising the step of substantially vertically arranging two or more of the cooling drums adjacent to one another.

12. A method according to claim 11, further comprising the step of guiding the semifinished products in an S-configuration about two cooling drums.

13. A method according to claim 9, further comprising the step of recycling the spent liquefied gas.

* * * * *